(12) United States Patent
Okano et al.

(10) Patent No.: US 11,086,441 B2
(45) Date of Patent: Aug. 10, 2021

(54) INFORMATION PROCESSING APPARATUS, METHOD FOR CONTROLLING INFORMATION PROCESSING APPARATUS, AND CONTROL PROGRAM FOR INFORMATION PROCESSING APPARATUS

(71) Applicant: SEIKO EPSON CORPORATION, Tokyo (JP)

(72) Inventors: Keiichi Okano, Matsumoto (JP); Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/751,277

(22) Filed: Jan. 24, 2020

(65) Prior Publication Data

US 2020/0241685 A1 Jul. 30, 2020

(30) Foreign Application Priority Data

Jan. 25, 2019 (JP) .............................. JP2019-011543

(51) Int. Cl.
*G06F 3/041* (2006.01)
*G06F 3/01* (2006.01)
*G02B 27/01* (2006.01)

(52) U.S. Cl.
CPC ....... *G06F 3/0416* (2013.01); *G02B 27/0172* (2013.01); *G06F 3/011* (2013.01); *G02B 2027/014* (2013.01); *G02B 2027/0178* (2013.01); *G06F 2203/04101* (2013.01)

(58) Field of Classification Search
CPC ................... G06F 3/0416; G06F 3/011; G06F 2203/04101; G02B 27/0172; G02B 2027/014; G02B 2027/0178
See application file for complete search history.

(56) References Cited

U.S. PATENT DOCUMENTS

| | | | |
|---|---|---|---|
| 2015/0029088 A1* | 1/2015 | Kim | H04W 52/0254 |
| | | | 345/156 |
| 2016/0349989 A1* | 12/2016 | Yu | G06F 3/04847 |
| 2018/0004297 A1* | 1/2018 | Xu | G06F 3/011 |

FOREIGN PATENT DOCUMENTS

JP 2015-197694 A 11/2015

* cited by examiner

*Primary Examiner* — Robert J Michaud
(74) *Attorney, Agent, or Firm* — Oliff PLC

(57) ABSTRACT

The smartphone includes an I/F unit that can be coupled with an HMD, a touch sensor, and a mode switching unit. The mode switching unit is configured to switch, depending on whether the I/F unit is coupled with the HMD, between a first mode in which an input detected by the touch sensor is received as an input in an absolute coordinate, and a second mode in which an input detected by the touch sensor is received as an input in a relative coordinate, to execute the first mode or the second mode.

12 Claims, 10 Drawing Sheets

| TRAJECTORY | FUNCTION |
|---|---|
| ○ | FN1 FIRST FUNCTION |
| △ | FN2 SECOND FUNCTION |
| □ | FN3 THIRD FUNCTION |
| ⋮ | ⋮ |

FIG. 7

INFORMATION PROCESSING APPARATUS, METHOD FOR CONTROLLING INFORMATION PROCESSING APPARATUS, AND CONTROL PROGRAM FOR INFORMATION PROCESSING APPARATUS

The present application is based on, and claims priority from JP Application Serial Number 2019-011543, filed Jan. 25, 2019, the disclosure of which is hereby incorporated by reference herein in its entirety.

BACKGROUND

1. Technical Field

The present disclosure relates to an information processing apparatus, a method for controlling an information processing apparatus, and a control program for an information processing apparatus.

2. Related Art

There is known that an image displayed by a mobile terminal device such as a smartphone is displayed in a mirroring manner on a display device such as an HMD (see, for example, JP 2015-197694 A).

The mobile terminal device described in JP 2015-197694 A includes a touch panel and a processor. The processor causes an operation mode of the mobile terminal device to be switched from a first mode in which a touch panel is caused to display a content, to receive a touch input, to a second mode in which a touch panel is caused not to display a content, to receive a touch input, based on setting information associated with the content. Then, when the operation mode is switched, the display of the display device is caused to display the content.

In a configuration described in JP 2015-197694 A, there is a concern that a user operability occasionally becomes insufficient.

For example, the user operability occasionally becomes insufficient because the user operates a touch panel of a smartphone while visually recognizing an image displayed in a mirroring manner at an HMD.

SUMMARY

An aspect for resolving the above-described concern is an information processing apparatus including a coupling section configured to be coupled with a display device, a position input unit, and a mode switching unit configured to execute a first mode in which an input detected by the position input unit is received as an input in an absolute coordinate, and a second mode in which an input detected by the position input unit is received as an input in a relative coordinate, the mode switching unit being configured to switch, depending on whether the coupling section is coupled with the display device, between the first mode and the second mode, to execute the first mode or the second mode.

In the information processing apparatus, the mode switching unit may be configured to execute the first mode when the coupling section is not coupled with the display device, while the mode switching unit may be configured to execute the second mode when the coupling section is coupled with the display device.

The information processing apparatus described above may be configured to include a first display unit, and a display controller configured to cause the first display unit to display an image, the image including a pointer object.

In the information processing apparatus, the display controller may be configured, when the coupling section is coupled with the display device, to cause the first display unit to display the pointer object, while the display controller may be configured, when the coupling section is not coupled with the display device, not to cause the first display unit to display the pointer object.

In the information processing apparatus, the display controller may be configured, when the coupling section is coupled with the display device, to display the pointer object at a default position in the first display unit, or a position at which the pointer object is hidden in the first display unit.

The information processing apparatus may be configured to include a first reception unit configured to receive a trajectory of the pointer object, in which the display controller may be configured to cause the first display unit to display the trajectory.

The information processing apparatus may be configured to include a selection unit configured to select a function corresponding to the trajectory, and an execution unit configured to execute a function selected by the selection unit.

The information processing apparatus may be configured to include a second reception unit configured to receive an input of a character corresponding to the trajectory, in which the display controller may be configured to cause the first display unit to display the character.

In the information processing apparatus, the display controller may be configured, when the coupling section is coupled with the display device, to reduce a luminance of the first display unit, compared to a case where the coupling section is not coupled with the display device.

In the information processing apparatus, the display device may be configured to include a second display unit, and the display controller may be configured to cause the second display unit of the display device to display the image displayed by the first display unit.

Still another aspect for resolving the above-described concern is a method for controlling an information processing apparatus, the information processing apparatus including a coupling section configured to be coupled with a display device, and a position input unit, the method including mode-switching being able to execute a first mode in which an input detected by the position input unit is received as an input in an absolute coordinate, and a second mode in which an input detected by the position input unit is received as an input in a relative coordinate, and the mode-switching switches, depending on whether the coupling section is coupled with the display device, between the first mode and the second mode, to execute the first mode or the second mode.

Still another aspect for resolving the above-described concern is a method for controlling an information processing apparatus, the information processing apparatus including a coupling section configured to be coupled with a display device, and a position input unit, the method including mode-switching being able to execute a first mode in which an input detected by the position input unit is received as an input in an absolute coordinate, and a second mode in which an input detected by the position input unit is received as an input in a relative coordinate, the mode-switching including switching, depending on whether the coupling section is coupled with the display device, between the first mode and the second mode, to execute the first mode or the second mode.

BRIEF DESCRIPTION OF THE DRAWINGS

FIG. 7 is a chart illustrating an example of a relationship between a trajectory and a function.

DESCRIPTION OF EXEMPLARY EMBODIMENTS

Exemplary embodiments are described below with reference to the accompanying drawings.

1. Configuration of Display System 1-1. Overall Configuration of Display System FIG. 1 is a diagram illustrating an overall configuration of a display system 1.

Figure 1:
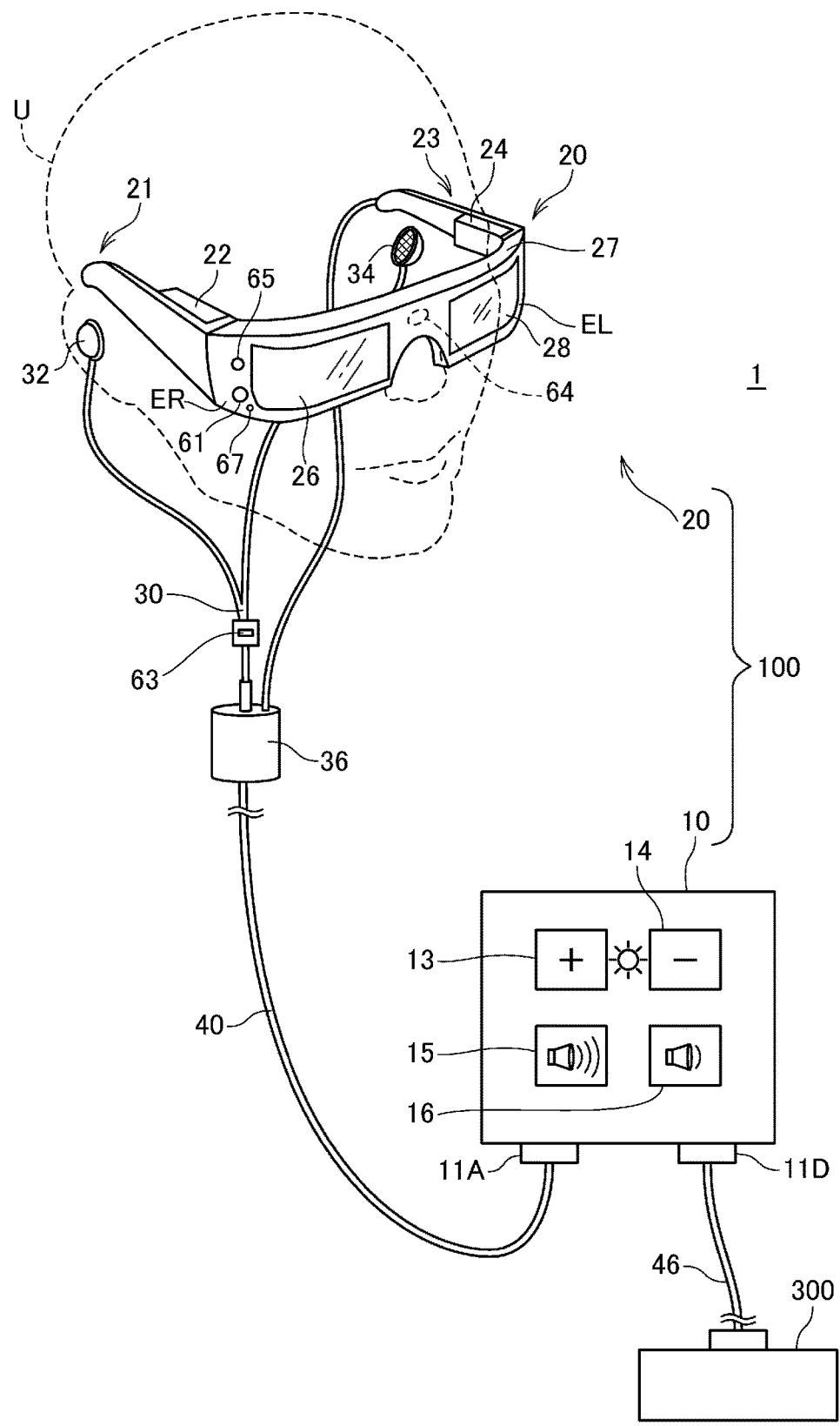
FIG. 1 is a diagram illustrating a configuration of a display system.

As illustrated in FIG. 1, the display system 1 includes a Head Mounted Display (HMD) 100. The HMD 100 includes a projected image display unit 20 to be mounted on a head of a user and a coupling device 10, and is a device that causes the projected image display unit 20 to allow the user to visually recognize a virtual image in a state of being mounted on the head of the user. The HMD 100 corresponds to an example of the "display device." In the following description, the user refers to a user who wears and uses the HMD 100.

The coupling device 10 includes a connector 11A and a connector 11D in a box shaped case. The projected image display unit 20 is coupled to the connector 11A via a coupling cable 40. Hereinafter, when the connectors 11A and 11D are not distinguished, the connectors 11A and 11D may be referred to as connector 11. The case of the coupling device 10 can be referred to as housing or main body as well.

The display system 1 is a system configured such that a smartphone 300 is coupled to the HMD 100. The connector 11D is an interface to which the smartphone 300 of the HMD 100 is coupled. That is, in the embodiment, the smartphone 300 is coupled to the connector 11D. The smartphone 300 corresponds to an example of the "information processing apparatus."

Note that the smartphone 300 is merely an example of the information processing apparatus. For example, the coupling device 10 can be coupled with a tablet personal computer, a notebook personal computer, or the like as the information processing apparatus.

The connector 11 is a wired interface coupled with a communication cable, and the coupling device 10 is coupled to an external apparatus via the communication cable. The connector 11A includes a terminal to be coupled with the coupling cable 40 and an interface circuit configured to send and receive a signal via the connector 11A.

The connector 11A is provided to couple the coupling device 10 with the projected image display unit 20. The coupling cable 40 is configured to supply power from the coupling device 10 to the projected image display unit 20, and has a function of causing the projected image display unit 20 and the coupling device 10 to mutually send and receive data.

The connector 11D is an interface configured to be input with projected image data from the smartphone 300, and to output sensor data to the smartphone 300. The smartphone 300 is configured to reproduce content data stored in a non-volatile storage unit. For example, the connector 11D is a connector compatible to a publicly known communication interface standard.

In the embodiment, the connector 11D is, as an example, an interface corresponding to projected image data and an input/output of various types of data, and to which the smartphone 300 is coupled via a USB cable 46.

As the connector 11D, a connector of a Universal Serial Bus (USB)-Type C standard can be employed, for example. An interface corresponding to the USB-Type C can send data in accordance with the USB 3.1 standard, and can supply DC power within 20 volts and 5 amperes.

Further, as a function of an alternative mode of the USB-Type C, projected image data of the High Definition Multimedia Interface (HDMI) standard, projected image data of the Mobile High-definition Link (MHL) standard, and the like can be transmitted. The smartphone 300 can perform, for example, power supply, sending and receiving of data, and supplying streaming data of projected image and audio data via the USB cable 46. The alternative mode of the USB-Type C is known as Alternative mode. The term HDMI is a registered trademark.

The projected image display unit 20 has an eyeglasses-like shape in the embodiment. The projected image display unit 20 includes a main body including a right holding portion 21, a left holding portion 23, and a front frame 27. The main body further includes a right display unit 22, a left display unit 24, a right light-guiding plate 26, and a left light-guiding plate 28.

The projected image display unit 20 corresponds to an example of the "second display unit."

The right holding portion 21 and the left holding portion 23 extend rearward from the both ends of the front frame 27, to hold the projected image display unit 20 at a head U of the user. One of the both ends of the front frame 27, which lies on the right side of the head U when the projected image display unit 20 is worn, is referred to as end portion ER, while the other one of the both ends, which lies on the left side, is referred to as end portion EL. The right holding portion 21 is provided extending from the end portion ER of the front frame 27 to a position corresponding to the right side of the head of the user in a state where the projected image display unit 20 is worn. The left holding portion 23 is provided extending from the end portion EL to a position corresponding to the left side of the head of the user in a state where the projected image display unit 20 is worn.

The right light-guiding plate 26 and the left light-guiding plate 28 are provided at the front frame 27. The right light-guiding plate 26 lies in front of the right eye of the user in a state where the projected image display unit 20 is worn to cause the user to visually recognize an image with the right eye. The left light-guiding plate 28 lies in front of the left eye of the user in a state where the projected image display unit 20 is worn to cause the user to visually recognize an image with the left eye.

The front frame 27 has a shape formed by mutually coupling an end of the right light-guiding plate 26 and an end of the left light-guiding plate 28, where the coupling position corresponds to between the eyebrows of the user in a state where the user wears the projected image display unit 20.

The front frame 27 may include a nose pad that abuts against the nose of the user in a state where the projected image display unit 2020 is worn, at the coupling position of the right light-guiding plate 26 and the left light-guiding plate 28. In this case, the projected image display unit 20 can be held to the head of the user with the nose pad, the right holding portion 21, and the left holding portion 23. In addition, a belt may be joined to the right holding portion 21 and the left holding portion 23, which comes in contact with the back of the head of the user in a state where the projected image display unit 20 is worn. In this case, the belt allows the projected image display unit 20 to be firmly held at the head U of the user.

Each of the right display unit 22 and the left display unit 24 includes a module in which an optical unit and a peripheral circuit are unitized.

The right display unit 22 is a unit related to display of an image due to the right light-guiding plate 26, and is provided at the right holding portion 21, being located adjacent to the right side of the head of the user in a wearing state. The left display unit 24 is a unit related to display of an image due to the left light-guiding plate 28, and is provided at the left holding portion 23, being located adjacent to the left side of the head of the user in a wearing state. Note that, the right display unit 22 and the left display unit 24 may be collectively referred to as "display driving unit" in a simple manner.

The right light-guiding plate 26 and the left light-guiding plate 28 are optical sections formed of a light transmissive resin or the like, and guide image light output from the right display unit 22 and the left display unit 24, to the eyes of the user. The right light-guiding plate 26 and the left light-guiding plate 28 are, for example, prisms.

The image light guided by the right light-guiding plate 26 and external light transmitted through the right light-guiding plate 26 are incident on the right eye of the user. Similarly, the image light guided by the left light-guiding plate 28 and external light transmitted through the left light-guiding plate 28 are incident on the left eye.

An illuminance sensor 65 is disposed at the front frame 27 of the projected image display unit 20. The illuminance sensor 65 is configured to receive external light coming from the front of the user wearing the projected image display unit 20.

A camera 61 is disposed at the front frame 27 of the projected image display unit 20. The camera 61 is provided at a position at which the camera 61 does not block the external light transmitted through the right light-guiding plate 26 and the left light-guiding plate 28. In the example of FIG. 1, the camera 61, which is disposed on the end portion ER side of the front frame 27, may be disposed on the end portion EL side, or may be disposed at a coupling portion between the right light-guiding plate 26 and the left light-guiding plate 28.

The camera 61 is a digital camera equipped with an imaging element such as a Charge Coupled Device (CCD) or a Complementary Metal-Oxide-Semiconductor (CMOS), imaging lens, and the like. The camera 61 according to the embodiment includes a monocular camera, and may also be configured by a stereo camera as well.

A Light Emitting Diode (LED) indicator 67 is disposed at the front frame 27. The LED indicator 67 is disposed adjacent to the camera 61 at the end portion ER, and is configured to light up, while the camera 61 is operating, to indicate that an image-capturing is in progress.

A distance sensor 64 is provided at the front frame 27. The distance sensor 64 is configured to detect a distance to a target object to be measured located in a preset measurement direction. The distance sensor 64 may be a light reflective distance sensor including a light source, such as an LED or a laser diode, and a light-reception unit configured to receive the reflected light that the light emitted from the light source is reflected by the target object to be measured, for example. The distance sensor 64 may also be an ultrasonic wave distance sensor including a sound source configured to generate ultrasonic waves, and a detector configured to receive the ultrasonic waves reflected by the target object to be measured. For the distance sensor 64, a laser range scanner may also be used. In this case, a scanning can be performed for a wide range including the front of the projected image display unit 20.

Each of the right display unit 22 and the left display unit 24 of the projected image display unit 20 is coupled to the coupling device 10. In the HMD 100, the left holding portion 23 is coupled with the coupling cable 40, and wiring linked to the coupling cable 40 is laid inside the projected image display unit 20 to couple each of the right display unit 22 and the left display unit 24 to the coupling device 10.

The coupling cable 40 includes an audio connector 36, where a headset 30 including a right earphone 32 and a left earphone 34 constituting a stereo headphone, and a microphone 63, is coupled to the audio connector 36. The right earphone 32 is mounted on the right ear of the user and the left earphone 34 is mounted on the left ear of the user. The right earphone 32 and the left earphone 34 may also be referred to as sound output unit.

The right earphone 32 and the left earphone 34 output a sound based on a sound signal output from the coupling device 10.

The microphone 63 is configured to collect a sound and outputs a sound signal to the coupling device 10. The microphone 63 may be, for example, a monaural microphone or a stereo microphone, or may be a directional microphone or a non-directional microphone.

The coupling device 10 includes a brightness adjustment key 13, a brightness adjustment key 14, a sound volume adjustment key 15, and a sound volume adjustment key 16 as operated portions to be operated by the user. Each of the brightness adjustment key 13, the brightness adjustment key 14, the sound volume adjustment key 15, and the sound volume adjustment key 16 is composed of a hardware key. These operated portions are arranged at a surface of the main body of the coupling device 10, and may be operated with fingers of the user, for example.

The brightness adjustment keys 13 and 14 are hardware keys for adjusting a display brightness of an image displayed by the projected image display unit 20. The brightness adjustment key 13 is for commanding an increase in brightness, and the brightness adjustment key 14 is for commanding a reduction in brightness. The sound volume adjustment keys 15 and 16 are hardware keys for adjusting volume of the sound output from the right earphone 32 and the left earphone 34. The sound volume adjustment key 15 is for commanding an increase in volume, and the sound volume adjustment key 16 is for commanding a reduction in volume.

1-2. Configuration of Optical System of Image Display Unit of HMD.

Figure 2:
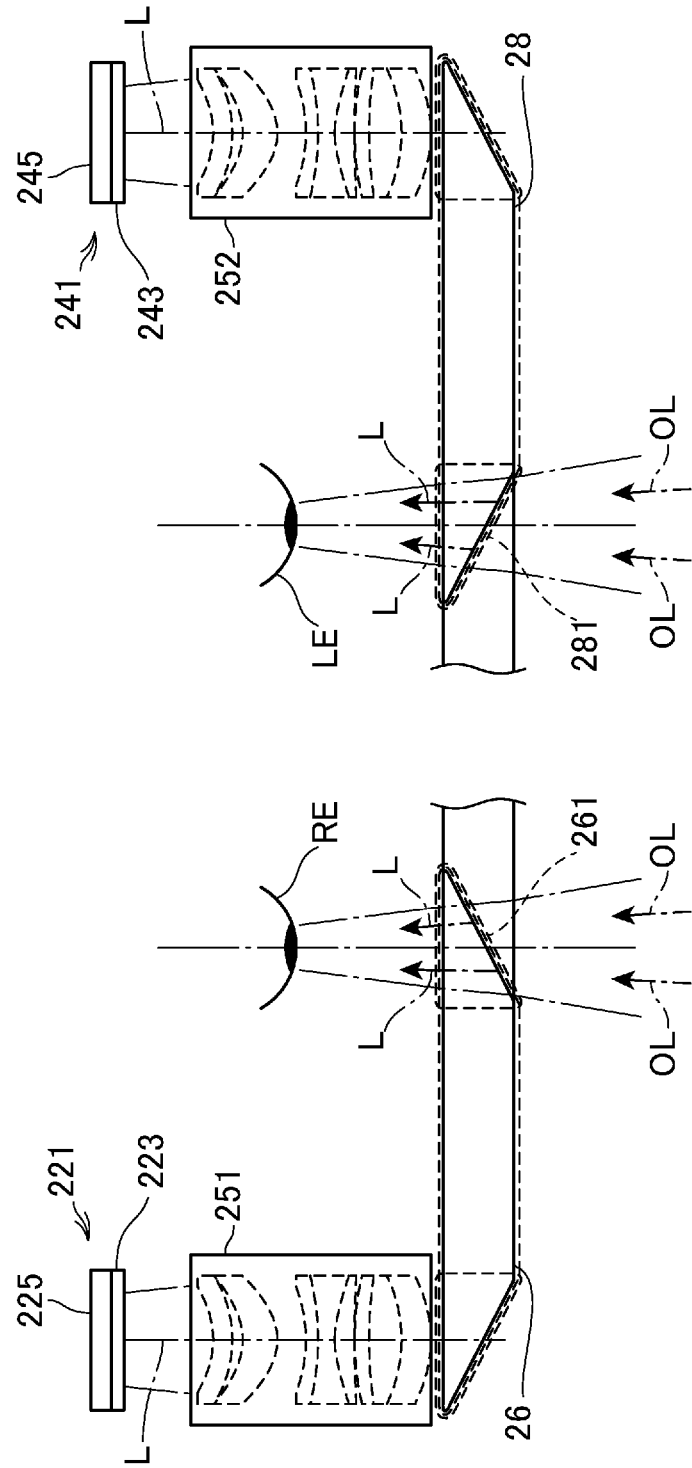
FIG. 2 is a view illustrating a configuration of an optical system of an image display unit.

FIG. 2 is a plan view illustrating a main section of a configuration of an optical system included in the projected image display unit 20. In FIG. 2, a left eye LE and a right eye RE of the user are illustrated for explanation.

As illustrated in FIG. 2, the right display unit 22 and the left display unit 24 are arranged symmetrically on the right- and left-hand sides. As a configuration in which the right eye RE of the user is caused to visually recognize an image, the right display unit 22 includes an Organic Light Emitting Diode (OLED) unit 221 configured to emit image light. The right display unit 22 also includes a right optical system 251 including a lens group that guides image light L emitted from the OLED unit 221, and the like. The image light L is guided by the right optical system 251 to the right light-guiding plate 26.

The OLED unit 221 includes an OLED panel 223 and an OLED drive circuit 225 configured to drive the OLED panel 223. The OLED panel 223 is a self-light emission display panel including light-emitting elements arranged in a matrix pattern and configured to emit light by organic electroluminescence to emit red (R) color light, green (G) color light, and blue (B) color light, respectively. The OLED panel 223 includes, as one pixel, a unit including, one by one, an R element, a G element, and a B element, and includes a plurality of the pixels, forming an image with the plurality of the pixels arranged in a matrix pattern. The OLED drive circuit 225 is configured, in accordance with a control of a second controller 120, to perform selection and powering of the light-emitting elements included in the OLED panel 223 to cause the light-emitting elements of the OLED panel 223 to emit light. The second controller 120 will be described later with reference to FIG. 4.

Figure 4:
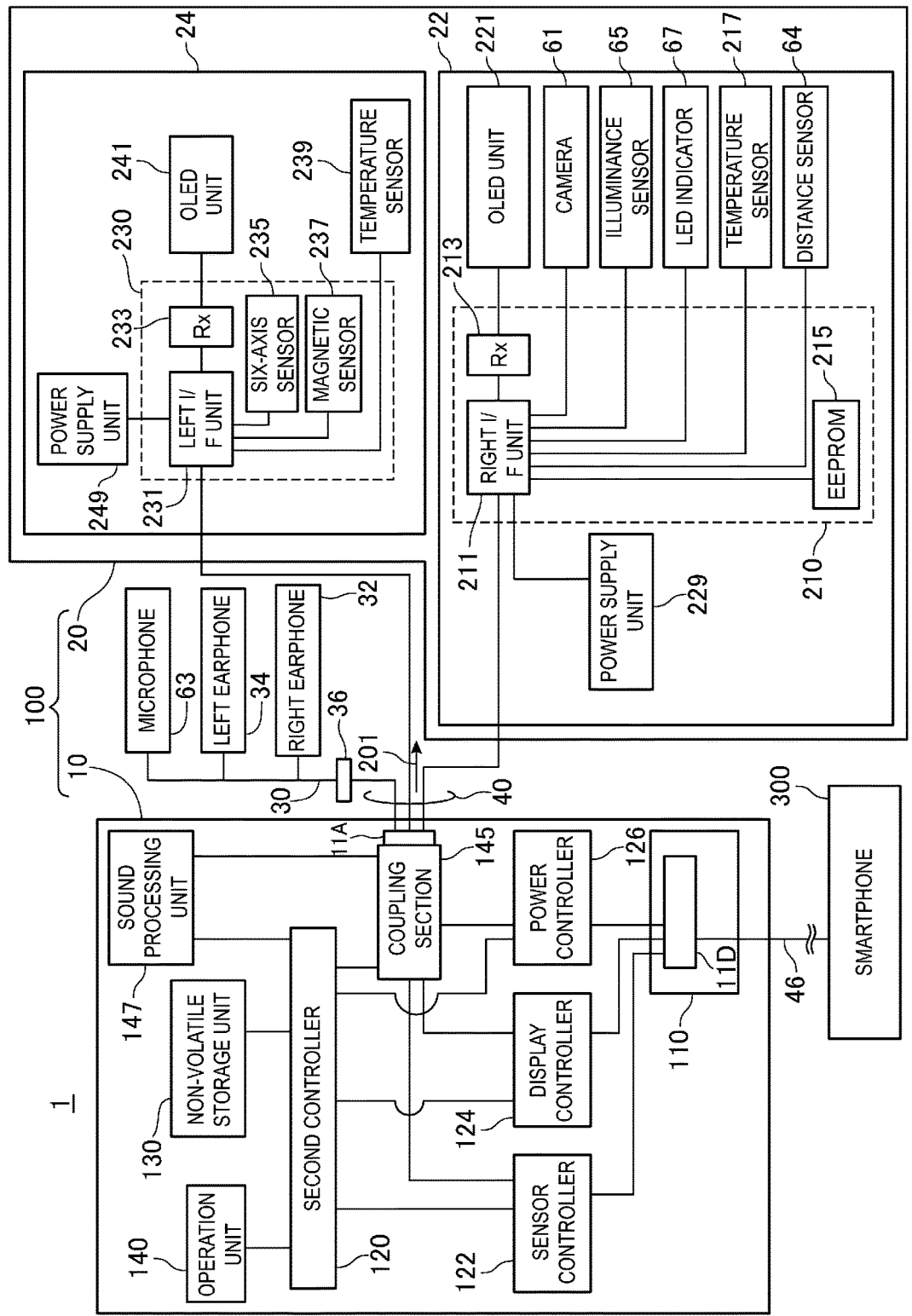
FIG. 4 is a diagram illustrating a configuration of components that configure an HMD.

The OLED drive circuit 225 is fixed by bonding or the like to a rear face of the OLED panel 223, that is, a back side of a light-emitting surface of the OLED panel 223. The OLED drive circuit 225 may be configured, for example, with a semiconductor device configured to drive the OLED panel 223, and may be mounted on a board (not illustrated) fixed to the rear face of the OLED panel 223. A temperature sensor 217 illustrated in FIG. 4 is mounted on the board.

Note that the OLED panel 223 may be configured such that light-emitting elements configured to emit white color light are disposed in a matrix pattern, and color filters corresponding to an R color, a G color, and a B color, respectively, are disposed to be stacked over the light-emitting elements. The OLED panel 223 of WRGB configuration including light-emitting elements configured to emit white (W) color light may also be used, in addition to the light-emitting elements configured to emit R color light, G color light, and B color light, respectively.

The right optical system 251 includes a collimate lens that collimates the image light L emitted from the OLED panel 223 into parallel light fluxes. The image light L collimated into the parallel light fluxes by the collimate lens is incident on the right light-guiding plate 26. In an optical path to guide light inside the right light-guiding plate 26, a plurality of reflective faces that reflect the image light L are formed. The image light L is reflected multiple times inside the right light-guiding plate 26 and is then guided to the right eye RE side. In the right light-guiding plate 26, a half mirror 261 (reflective face) located in front of the right eye RE is formed. The image light L, which is reflected by the half mirror 261, is emitted from the right light-guiding plate 26 toward the right eye RE, and the image light L forms an image on a retina of the right eye RE, to thus cause the user to visually recognize the image.

In addition, as a configuration in which the left eye LE of the user is caused to visually recognize an image, the left display unit 24 includes an OLED unit 241 configured to emit image light, and a left optical system 252 including a lens group that guides the image light L emitted from the OLED unit 241, and the like. The image light L is guided by the left optical system 252 to the left light-guiding plate 28.

The OLED unit 241 includes an OLED panel 243, and an OLED drive circuit 245 configured to drive the OLED panel 243. The OLED panel 243 is a self-light emission display panel configured in a similar manner to the OLED panel 223. The OLED drive circuit 245 is configured, in accordance with a command from the second controller 120, to perform selection and powering of the light-emitting elements included in the OLED panel 243 to cause the light-emitting elements of the OLED panel 243 to emit light.

The OLED drive circuit 245 is fixed by bonding or the like to a rear face of the OLED panel 243, that is, a back side of a light-emitting surface of the OLED panel 243. The OLED drive circuit 245 may be configured, for example, with a semiconductor device configured to drive the OLED panel 243, and may be mounted on a board (not illustrated) fixed to the rear face of the OLED panel 243. A temperature sensor 239 illustrated in FIG. 4 is mounted on the board.

The left optical system 252 includes a collimate lens that collimates the image light L emitted from the OLED panel 243 into parallel light fluxes. The image light L collimated into the parallel light fluxes by the collimate lens is incident on the left light-guiding plate 28. The left light-guiding plate 28 is an optical element in which a plurality of reflective faces that reflect the image light L are formed, and the left light-guiding plate 28 is, for example, a prism. The image light L is reflected multiple times inside the left light-guiding plate 28 and is then guided to the left eye LE side. In the left light-guiding plate 28, a half mirror 281 (reflective face) located in front of the left eye LE is formed. The image light L, which is reflected by the half mirror 281, is emitted from the left light-guiding plate 28 toward the left eye LE, and the image light L forms an image on a retina of the left eye LE, to thus cause the user to visually recognize the image.

According to the above configuration, the HMD 100 functions as a transmissive display device. That is, the image light L reflected by the half mirror 261 and external light OL transmitted through the right light-guiding plate 26 are incident on the right eye RE of the user. Further, the image light L reflected by the half mirror 281 and the external light OL transmitted through the half mirror 281 are incident on the left eye LE. As such, the HMD 100 superimposes the image light L of an image processed internally and the external light OL on each other to cause the superimposed image light L and external light OL to enter the eyes of the user. This causes the user to view an external scene through the right light-guiding plate 26 and the left light-guiding plate 28, and to visually recognize an image due to the image light L in a manner superimposed on the external scene.

The half mirrors 261 and 281 are image extraction units that reflect the image light output from the right display unit 22 and the left display unit 24, respectively, to extract images. Thus, the half mirrors 261 and 281 can be referred to as display units.

Note that the left optical system 252 and the left light-guiding plate 28 are collectively referred to as "left light-guiding unit," and the right optical system 251 and the right light-guiding plate 26 are collectively referred to as "right light-guiding unit." The configurations of the right light-guiding unit and the left light-guiding unit are not limited to the example described above, and can be used in any scheme as long as image light is used to form a virtual image in front of the eyes of the user, where, for example, a diffraction grating may be used, or a semi-transmissive reflection film may be used.

Figure 3:
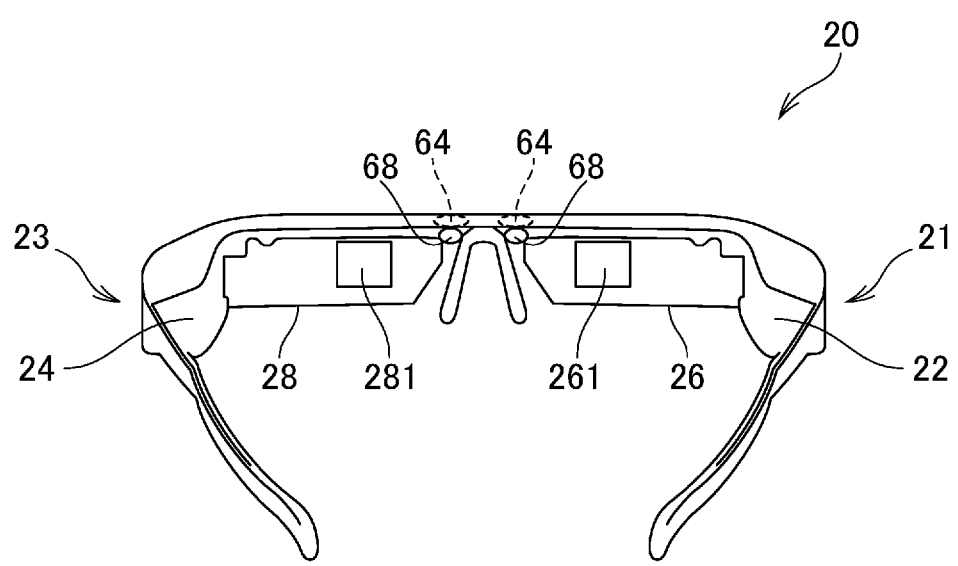
FIG. 3 is a perspective view illustrating a configuration of a main section of an image display unit.

FIG. 3 is a view illustrating a configuration of a main section of the projected image display unit 20. FIG. 3 is a perspective view of the main section of the projected image display unit 20 when viewed from a head side of the user. Note that, in FIG. 3, the coupling cable 40 is not illustrated.

FIG. 3 illustrates a side contacting the head of the user in the projected image display unit 20, in other words, a side viewed from the right eye RE and the left eye LE of the user. In other words, in FIG. 3, back sides of the right light-guiding plate 26 and the left light-guiding plate 28 are viewed.

In FIG. 3, the half mirror 261 that irradiates the right eye RE of the user with image light and the half mirror 281 that irradiates the left eye LE with image light are viewed as approximately square-shaped regions. Alternatively, the entire of the right light-guiding plate 26 including the half mirror 261, and the entire of left light-guiding plate 28 including the half mirror 281 transmit the external light as described above. This causes the user to visually recognize an external scene through the entire of the right light-guiding plate 26 and the left light-guiding plate 28, and to visually recognize rectangular display images at positions of the half mirrors 261 and 281.

In addition, on the user side of the projected image display unit 20, inner cameras 68 are arranged. A pair of inner cameras 68 are provided at a central position between the right light-guiding plate 26 and the left light-guiding plate 28 to correspond to the right eye RE and the left eye LE of the user, respectively. The inner cameras 68 are a pair of cameras that captures images of the right eye RE and the left eye LE of the user, respectively. The inner cameras 68 are configured to perform capturing an image in accordance with a command from the second controller 120. The second controller 120 is configured to analyze captured image data of the inner cameras 68. For example, the second controller 120 detects images of reflected light and pupils on surfaces of eyeballs of the right eye RE and the left eye LE from the captured image data of the inner cameras 68, and to determine a sight line direction of the user. The second controller 120 may also determine a change in the sight line direction of the user, and may detect an eyeball movement of each of the right eye RE and the left eye LE.

Here, the movement of the sight line of the user can also be regarded as a movement of a virtual viewpoint of the user.

The second controller 120, when detecting the sight line directions of the right eye RE and the left eye LE from the captured images of the inner cameras 68, can also determine the convergence angle of the right eye RE and the left eye LE. The convergence angle corresponds to a distance to the target object on which the user fixes the eyes. That is, when the user visually recognizes an image and an object in three dimensions, the convergence angle of the right eye RE and the left eye LE is determined in accordance with the distance to the target to be visually recognized. Thus, the convergence angle is detected to determine a distance from the user to the point on which the user fixes the eyes. In addition, an image is displayed to guide the convergence angle of the user, to thus induce a stereoscopic view.

1-3. Configurations of Components of HMD

FIG. 4 is a diagram illustrating a configuration of components that configure the HMD 100.

The right display unit 22 of the projected image display unit 20 includes a right display unit board 210. The right display unit board 210 is mounted with a right I/F unit 211 coupled to the coupling cable 40, a reception unit 213 configured to receive data input from the coupling device 10 via the right I/F unit 211, and an EEPROM 215. The right I/F unit 211 couples the coupling device 10 with the reception unit 213, the EEPROM 215, the temperature sensor 217, the camera 61, the distance sensor 64, the illuminance sensor 65, and the LED indicator 67. The reception unit 213 couples the OLED unit 221 to the coupling device 10.

The left display unit 24 includes a left display unit board 230. The left display unit board 230 is mounted with a left I/F unit 231 coupled to the coupling cable 40, a reception unit 233 configured to receive data input from the coupling device 10 via the left I/F unit 231. The left display unit board 230 is also mounted with a six-axis sensor 235 and a magnetic sensor 237.

The left I/F unit 231 couples the coupling device 10 with the reception unit 233, the six-axis sensor 235, the magnetic sensor 237, and the temperature sensor 239. The reception unit 233 couples the OLED unit 241 with the coupling device 10.

The term I/F is an abbreviation for interface. The term EEPROM is an abbreviation for Electrically Erasable Programmable Read-Only Memory. The term OLED is an abbreviation for Organic Light Emitting Diode. Note that in the embodiment, the reception unit 213 and the reception unit 233 may be referred to as Rx 213 and Rx 233, respectively.

The EEPROM 215 is configured to store various types of data in a non-volatile manner. The EEPROM 215 stores, for example, data about light-emitting properties and display properties of the OLED units 221 and 241 included in the projected image display unit 20, and data about a property of a sensor included in the right display unit 22 or the left display unit 24.

Specifically, the EEPROM 215 stores parameters regarding gamma correction of the OLED units 221 and 241, data used to compensate for detection values of the temperature sensors 217 and 239, and the like. These kinds of data are generated by inspection at the time of factory shipment of the HMD 100, and are written into the EEPROM 215. The data stored in the EEPROM 215 can be read out by the second controller 120.

The camera 61 is configured to perform capturing an image in accordance with a signal input via the right I/F unit 211 and outputs the captured image data to the right I/F unit 211. The illuminance sensor 65 is configured to receive external light and to output a detection value corresponding to an amount of the received light or an intensity of the received light. The LED indicator 67 is configured to light up in accordance with a control signal or a driving current input via the right I/F unit 211.

The temperature sensor 217 is configured to detect a temperature of the OLED unit 221, and to output a voltage value or a resistance value corresponding to the detected temperature as a detection value.

The distance sensor 64 is configured to execute distance detection, and output a signal indicating the detection result to the coupling device 10 via the right I/F unit 211. As the distance sensor 64, for example, an infrared ray depth sensor, an ultrasonic distance sensor, a Time Of Flight distance sensor, a distance detecting unit configured to combine image detection and sound detection, or the like can be used. In addition, the distance sensor 64 may be configured to process an image obtained by stereo photographing by a stereo camera or a monocular camera, to detect a distance.

The reception unit 213 is configured to receive projected image data for display sent from the coupling device 10 via the right I/F unit 211, and to output the projected image data to the OLED unit 221. The OLED unit 221 is configured to display an image based on the projected image data sent by the coupling device 10.

The reception unit 233 is also configured to receive projected image data for display sent from the coupling device 10 via the left I/F unit 231, and to output the projected image data to the OLED unit 241. The OLED units 221 and 241 display images based on the projected image data sent by the coupling device 10.

The six-axis sensor 235 is a motion sensor equipped with a three-axis acceleration sensor and a three-axis gyro sensor. For the six-axis sensor 235, an IMU in which the above-described sensors are provided as module can be employed. The magnetic sensor 237 is a three-axis geomagnetic sensor, for example. The gyro sensor is also referred to as angular velocity sensor. The term IMU is an abbreviation for Inertial Measurement Unit.

The temperature sensor 239 is configured to detect a temperature of the OLED unit 241, and to output a voltage value or a resistance value corresponding to the detected temperature as a detection value.

Each of the components of the projected image display unit 20 operates with power supplied from the coupling device 10 via the coupling cable 40.

The projected image display unit 20 includes a power supply unit 229 at the right display unit 22, and a power supply unit 249 at the left display unit 24. The power supply unit 229 is configured to distribute and supply power supplied by the coupling device 10 via the coupling cable 40 to each of the components of the right display unit 22 including the right display unit board 210. Similarly, the power supply unit 249 is configured to distribute and supply power supplied by the coupling device 10 via the coupling cable 40 to each of the components of the left display unit 24 including the left display unit board 230. The right display unit 22 and the left display unit 24 may include a conversion circuit or the like configured to convert a voltage.

The coupling device 10 includes an I/F unit 110, the second controller 120, a sensor controller 122, a display controller 124, a power controller 126, a non-volatile storage unit 130, an operating unit 140, a coupling section 145, and a sound processing unit 147.

The I/F unit 110 includes the connector 11D. The I/F unit 110 also includes an interface circuit coupled to the connector 11D and configured to execute communication protocols compliant with various communication standards.

The I/F unit 110 may be, for example, an interface board on which the connector 11D and the interface circuit are mounted. A configuration may also be employed in which the second controller 120, the sensor controller 122, the display controller 124, and the power controller 126 of the coupling device 10 are mounted on a non-illustrated coupling device main board. In this case, the coupling device main board may be mounted with the connector 11D and the interface circuit of the I/F unit 110.

The I/F unit 110 may also include, for example, an interface for a memory card configured to be coupled with an external storage device or a storage medium, and the like, or the I/F unit 110 may also be configured with a wireless communication interface.

The second controller 120 is configured to control each of the components of the coupling device 10. The second controller 120 includes a processor such as a CPU. The term CPU is an abbreviation for Central Processing Unit. The second controller 120 causes the processor to execute a control program to control each of the components of the HMD 100 through cooperation between software and hardware. The second controller 120 is coupled with the non-volatile storage unit 130, the operating unit 140, the coupling section 145, and the sound processing unit 147.

The sensor controller 122 is configured to control the camera 61, the distance sensor 64, the illuminance sensor 65, the temperature sensor 217, the six-axis sensor 235, the magnetic sensor 237, and the temperature sensor 239. Specifically, the sensor controller 122, in accordance with the control of the second controller 120, executes setting and initialization of a sampling period of each of the sensors, and, in correspondence to the sampling period of each of the sensors, executes energization to each of the sensors, transmission of control data, acquisition of detection values, and the like.

The sensor controller 122 is coupled to the connector 11D of the I/F unit 110, and outputs the data about the detection value acquired from each of the sensors to the connector 11D at a preset timing. The smartphone 300 coupled to the connector 11D can acquire the detection value of each of the sensors of the HMD 100 and the captured image data of the camera 61.

The display controller 124 is configured to execute various processing for the projected image display unit 20 to display an image based on image data and projected image data input to the I/F unit 110. In the embodiment, a projected image signal output from the smartphone 300 is input to the connector 11D. The projected image signal is projected image data of digital signal, and may also be an analog projected image signal.

For example, the display controller 124 executes various processing such as cutting out of a frame, resolution conversion, intermediate frame generation, and frame rate conversion. The resolution conversion includes so-called scaling. The display controller 124 is configured to output image data corresponding to each of the OLED unit 221 and the OLED unit 241 to the coupling section 145. The image data input to the coupling section 145 is sent from the connector 11A to the right I/F unit 211 and the left I/F unit 231, as a projected image signal 201. The projected image signal 201 is projected image data of digital signal processed corresponding to each of the OLED unit 221 and the OLED unit 241.

In the embodiment, the connector 11D is configured with a USB-Type C connector. The display controller 124 receives projected image data sent in USB-Type C alternative mode via the connector 11D.

One of the sensor controller 122 and the display controller 124 may be achieved through cooperation between software and hardware by a processor executing a program. That is, the sensor controller 122 and the display controller 124, which are configured with the processor, execute the program to perform the operations described above. In this example, the sensor controller 122 and the display controller 124 may be achieved by a processor that constitutes the second controller 120 executing the program. In other words, the processor may function, by executing the program, as the second controller 120, the display controller 124, and the sensor controller 122. Here, the processor can be paraphrased as computer.

The display controller 124 and the sensor controller 122 may also be configured by a programmed hardware such as DSP or FPGA. The sensor controller 122 and the display controller 124 may also be integrated to be configured as an SoC-FPGA. The term DSP is an abbreviation for Digital Signal Processor, the term FPGA is an abbreviation for Field Programmable Gate Array, and the term SoC is an abbreviation for System-on-a-Chip.

The power controller 126 is coupled to the connector 11D. The power controller 126 is configured, based on power supplied from the connector 11D, to supply power to each of the components of the coupling device 10 and to the projected image display unit 20. The power controller 126 may also be configured to include a non-illustrated voltage conversion circuit, and may also be configured to convert and supply voltage to each of the components of the coupling device 10 and the projected image display unit 20. The power controller 126 may be configured with a programmed semiconductor device such as a logic circuit or a FPGA. In addition, the power controller 126 may be configured with a hardware shared with at least one of the sensor controller 122 and the display controller 124.

Each of the sensor controller 122, the display controller 124, and the power controller 126 may include a work memory for executing data processing, and may execute processing by means of a memory of the second controller 120.

The operating unit 140 is configured to detect an operation on an operated portion included in the coupling device 10 and to output data indicating an operation content or an operation signal indicating the operated portion having been operated to the second controller 120.

The sound processing unit 147 is configured to generate a sound signal in accordance with sound data input from the second controller 120, and to output the sound signal to the coupling section 145. This sound signal is output from the coupling section 145 to the right earphone 32 and the left earphone 34 via the audio connector 36. The sound processing unit 147 also adjusts a volume of the sound signal in accordance with the control of the second controller 120. The sound processing unit 147 also generates sound data of the sound collected by the microphone 63, and outputs the sound data to the second controller 120. The sound data may be processed by the second controller 120 in the same manner as the detected value of the sensor included in the projected image display unit 20.

The coupling device 10 may also be configured to include a non-illustrated battery, and may also be configured to supply power, from the battery, to each of the components of the coupling device 10 and the projected image display unit 20 The battery included in the coupling device 10 may be a rechargeable secondary battery.

1-4. Configuration of Smartphone

Figure 5:
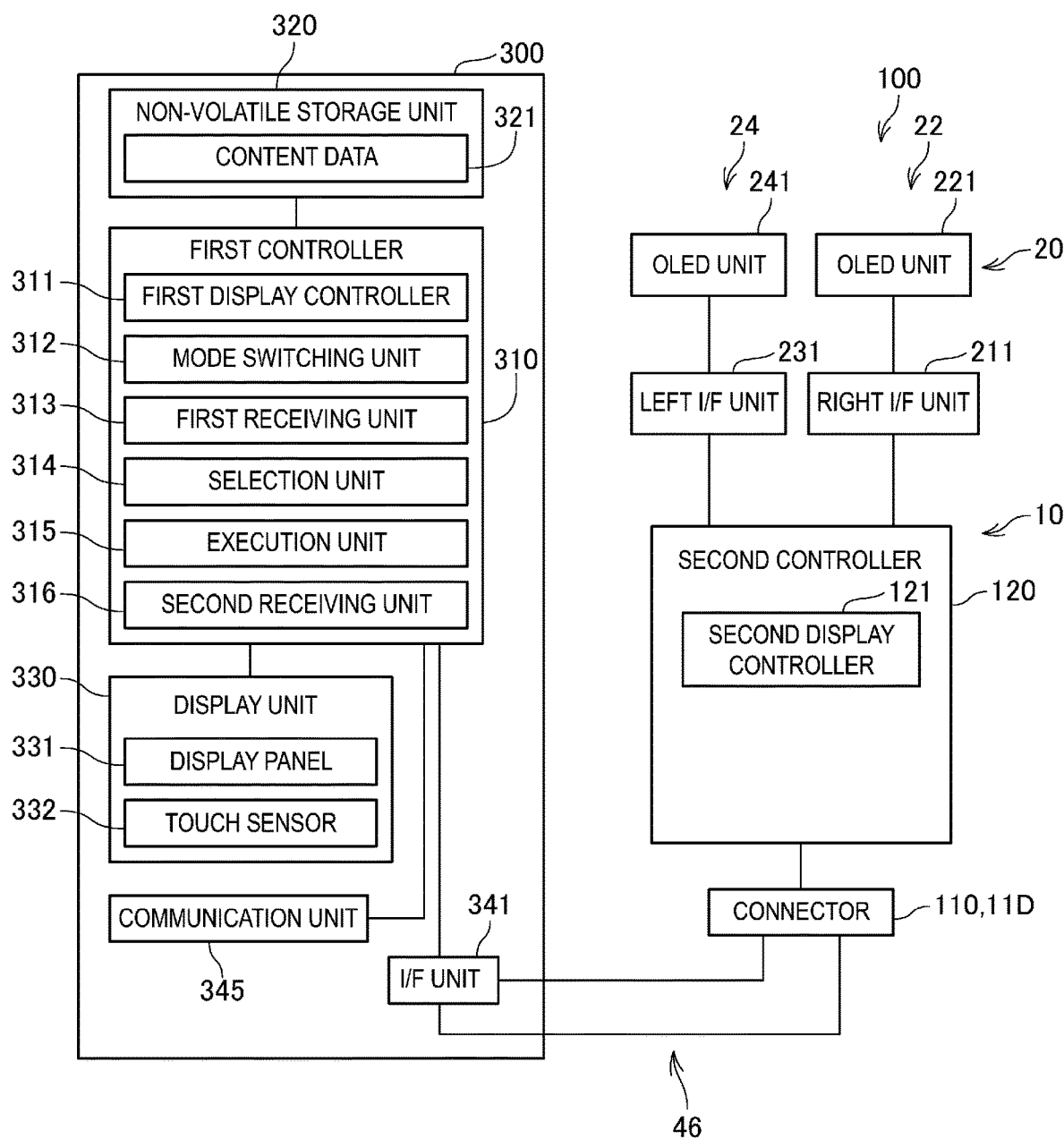
FIG. 5 is a diagram illustrating a configuration of a first controller of an HMD, and a smartphone.

FIG. 5 is a diagram illustrating a configuration of the second controller 120 of the HMD 100 and the smartphone 300.

The smartphone 300 includes a first controller 310, a non-volatile storage unit 320, the display unit 330, an I/F unit 341, and a communication unit 345.

The first controller 310 includes a processor such as a CPU or a microcomputer, and causes the processor to execute a control program, to thus control each of the components of the smartphone 300. The first controller 310 may include a ROM configured to store, in a non-volatile manner, a control program to be executed by the processor, and a RAM constituting a work area of the processor. The processor corresponds to an example of the "computer." The term ROM is an abbreviation for Read Only Memory, and the term RAM is an abbreviation for Random Access Memory. The control program stored in the memory of the first controller 310 corresponds to an example of the "control program."

The non-volatile storage unit 320 is configured to store, in a non-volatile manner, a control program to be executed by the first controller 310, and data to be processed by the first controller 310. The non-volatile storage unit 130 is, for example, a magnetic recording device such as an HDD, or a storage device using a semiconductor storage element such as a flash memory. The term HDD is an abbreviation for Hard Disk Drive.

The non-volatile storage unit 320 stores, for example, content data 321 of a content including an image. The content data 321 is a file in a format that can be processed by the first controller 310, and includes projected image data, and may include sound data.

The non-volatile storage unit 320 also stores an operating system (OS) as a basic control program executed by the first controller 310, an application program configured to operate using the OS as a platform, and the like. The non-volatile storage unit 320 also stores data processed during the execution of the application program and data of the processing result. The term OS is an abbreviation for Operating System.

A display panel 331 and a touch sensor 332 included in the display unit 330 are coupled to the first controller 310. The display panel 331 is configured to display various images based on the control of the first controller 310. The display panel 331 is constituted by a Liquid Crystal Display (LCD), for example. The display panel 331 is configured in a rectangular shape. In the embodiment, the display panel 331 has a rectangular shape. The display panel 331 corresponds to an example of the "first display unit."

The touch sensor 332 is configured to detect a touch operation and to output data indicating the detected operation to the first controller 310. The touch sensor 332 is integrally formed with the display panel 331. Specifically, the touch sensor 332 is formed on the image display surface of the display panel 331. In the embodiment, the touch sensor 332 has a rectangular shape. The data output from the touch sensor 332 is coordinate data indicating an operation position in the touch sensor 332, and the like. The touch sensor 332 corresponds to an example of the "position input unit."

In the embodiment, the touch sensor 332 outputs first coordinate data DA1 indicating absolute coordinates, and second coordinate data DA2 indicating relative coordinates.

The first coordinate data DA1 indicate the absolute coordinates of the position of the touch operation. For example, an X axis is set along a long side direction of the touch sensor 332, and a Y axis is set along a short side direction of the touch sensor 332. The long side direction of the touch sensor 332 coincides with a long side direction of the display panel 331, and the short side direction of the touch sensor 332 coincides with a short side direction of the display panel 331. The first coordinate data DA1 are constituted by X coordinate indicating a position in the X axis direction of the touch operation, and Y coordinate indicating a position in the Y-axis direction of the touch operation.

The second coordinate data DA2 indicate the relative coordinates of an amount of movement of the touch operation. That is, the second coordinate data DA2 indicate the amount of movement from a position of a starting point of the touch operation to a position of the touch operation after the movement. For example, the X axis is set along the long side direction of the touch sensor 332, and the Y axis is set along the short side direction of the touch sensor 332. The second coordinate data DA2 are constituted by X coordinate indicating an amount of change in position in the X axis direction of the touch operation, and Y coordinate indicating an amount of change in position in the Y axis direction of the touch operation.

The I/F unit 341 is an interface coupled to an external apparatus. The I/F unit 341 is configured to execute communication compliant with, for example, standard such as HDMI interface and USB interface. The I/F unit 341 includes a connector to be coupled with the USB cable 46, and an interface circuit configured to process a signal transmitted through the connector. The I/F unit 341 is an interface board including the connector and the interface circuit, and is coupled to a main board on which a processor and the like of the first controller 310 are mounted. Alternatively, the connector and the interface circuit constituting the I/F unit 341 are mounted on a main board of the smartphone 300. The I/F unit 341 corresponds to an example of the "coupling section."

In the embodiment, the I/F unit 341 includes a USB interface, and is coupled to the connector 11D via the USB cable 46. For example, the first controller 310 is configured to output image data via the USB cable 46, and receive data about an output value of sensor from the coupling device 10.

The I/F unit 341 may also be a radio communication interface. In this case, the I/F unit 341 can be an interface board on which a communication circuit including a Radio Frequency (RF) unit is mounted, or can be a circuitry mounted on the main board.

The communication unit 345 is a communication interface configured to execute data communication with an external apparatus. The communication unit 345 may be a wired communication interface configured to be coupled with a cable, or may be a radio communication interface. For example, the communication unit 345 may be a wired LAN interface corresponding to Ethernet (registered trademark), or a wireless LAN interface corresponding to IEEE802.11 standard.

The communication unit 345 is also a communication interface coupled to another smartphone via a wireless telephone line, for example.

The first controller 310 includes a first display controller 311, a mode switching unit 312, a first reception unit 313, a selection unit 314, an execution unit 315, and a second reception unit 316. Specifically, the first controller 310 functions, by causing the processor included in the first controller 310 to execute a control program. as the first display controller 311, the mode switching unit 312, the first reception unit 313, the selection unit 314, the execution unit 315, and the second reception unit 316

The first display controller 311 reproduces the content data 321 to cause the display panel 331 of the display unit 330 to display an image PT corresponding to the projected image data included in the content data 321.

The first display controller 311 also reduces a luminance of the display panel 331 of the display unit 330 depending on whether the I/F unit 341 is coupled with the HMD 100. Specifically, when the I/F unit 341 is coupled with the HMD 100, the first display controller 311 reduces the luminance of the display panel 331 of the display unit 330 compared to a case where the I/F unit 341 is not coupled with the HMD 100.

For example, when the I/F unit 341 is not coupled with the HMD 100, the first display controller 311 sets the luminance of the image PT displayed by the display unit 330 to a set luminance. When the I/F unit 341 is coupled with the HMD 100, the first display controller 311 also reduces the luminance of the image PT displayed by the display unit 330 to less than the set luminance.

More specifically, the first display controller 311 reduces the luminance of the image PT displayed on the display panel 331 by superimposing images having a constant concentration on the image PT. The "images having a constant concentration" may be referred to as "dark image" in the following description. Specifically, the "dark image" is images of gray color having a constant concentration. That is, the first display controller 311 virtually superimposes a layer on which the dark image is formed on an upper layer of the image PT displayed on the display panel 331, to thus reduce the luminance of the image PT displayed on the display panel 331.

The image PT also includes a pointer object PB. Specifically, when the I/F unit 341 is coupled with the HMD 100, the first display controller 311 causes the display panel 331 to display the pointer object PB. In addition, when the I/F unit 341 is not coupled with the HMD 100, the first display controller 311 does not cause the display panel 331 to display the pointer object PB. The pointer object PB indicates the position of the pointer. The pointer object PB is, for example, an object such as an arrow, and points to a tip of the arrow.

In addition, when the I/F unit 341 is coupled with the HMD 100, the first display controller 311 causes the pointer object PB to be displayed at a position P1 or a position P2. The position P1 indicates a default position on the display panel 331. The position P2 indicates a position at which the pointer object PB is hidden on the display panel 331.

The position P1 is, for example, a central position of the display panel 331. Further, the position P1 is, for example, any one of the four corners of the display panel 331. Further, the position P1 may be configurable by a user.

The position P2 corresponds to a position of the pointer object PB when a state where the I/F unit 341 is coupled with the HMD 100 is transitioned to a state where the I/F unit 341 is not coupled with the HMD 100.

The mode switching unit 312 is configured to execute a first mode MD1 and a second mode MD2, and switches, depending on whether the I/F unit 341 is coupled with the HMD 100, between the first mode MD1 and the second mode MD2, to execute the first mode MD1 and the second mode MD2. Specifically, when the I/F unit 341 is not coupled with the HMD 100, the mode switching unit 312 executes the first mode MD1. While when the I/F unit 341 is coupled with the HMD 100, the mode switching unit 312 executes the second mode MD2.

In the first mode MD1, an input detected by the touch sensor 332 is received as an input in absolute coordinates. In other words, in the first mode MD1, the first coordinate data DA1 is received from the touch sensor 332. The first coordinate data DA1 indicate the absolute coordinates of the position of a touch operation. In the second mode MD2, an input detected by the touch sensor 332 is received as an input in relative coordinates. In other words, in the second mode MD2, the second coordinate data DA2 is received from the touch sensor 332. The second coordinate data DA2 indicate the relative coordinates of the amount of movement of the touch operation.

The first reception unit 313 receives a trajectory TR of the pointer object PB. The first display controller 311 causes the display panel 331 to display the trajectory TR.

The selection unit 314 selects a function FN corresponding to the trajectory TR.

The execution unit 315 executes a function selected by the selection unit 314.

The second reception unit 316 receives an input of characters corresponding to the trajectory TR. The first display controller 311 causes the display panel 331 to display the characters received by the second reception unit 316.

Processing of the first controller 310 will be specifically described below with reference to FIGS. 6 to 8.

In the embodiment, the projected image data that the smartphone 300 outputs to the coupling device 10 are projected image data corresponding to an image displayed on the display panel 331 of the display unit 330. That is, the first display controller 311 causes the projected image display unit 20 of the HMD 100 to display the image displayed on the display panel 331. In this case, the projected image display unit 20 of the HMD 100 displays the same image as the image displayed on the display panel 331, and thus performs a so-called "mirroring display."

1-5. Configuration of Second Control Unit of HMD

The second controller 120 of the HMD 100 includes a second display controller 121. Specifically, the second controller 120 functions as the second display controller 121 by the processor included in the second controller 120 executing a control program.

The second display controller 121 receives an image from the smartphone 300 in accordance with a command from the first display controller 311 to cause the projected image display unit 20 to display the received image.

Specifically, the second display controller 121 generates a right image and a left image from the image received from the smartphone 300. Then, the second display controller 121 causes the right display unit 22 to display the right image, and causes the left display unit 24 to display the left image.

More specifically, the second display controller 121 sends the right image to the OLED unit 221 via the right I/F unit 211 to cause the OLED unit 221 to display the right image. The second display controller 121 also sends the left image to the OLED unit 241 via the left I/F unit 231 to cause the OLED unit 241 to display the left image.

2. Description of Processing of First Controller of Smartphone Using Specific Examples Each of FIGS. 6 to 8 is a view illustrating a specific example of processing of the first controller 310. Note that in FIGS. 6 to 8, a case where the I/F unit 341 is coupled with the HMD will be described.

Figure 6:
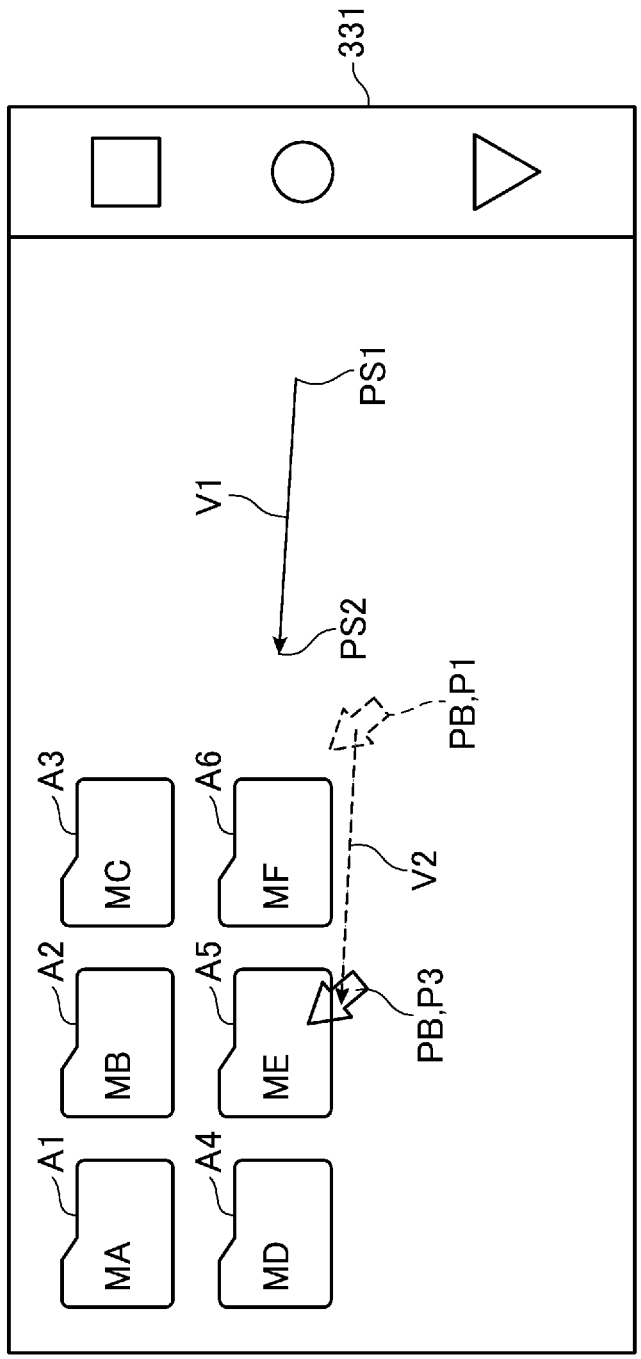
FIG. 6 is a screen view illustrating an example of an operation by a pointer object.

FIG. 6 is a screen view illustrating an example of an operation by the pointer object PB.

The first display controller 311 causes the display panel 331 to display an icon A1, an icon A2, an icon A3, an icon A4, an icon A5, an icon A6, and the pointer object PB.

Each of the icons A1 to A6 is associated with the content data 321 stored in the non-volatile storage unit 320. Specifically, the content data 321 includes content data MA, content data MB, content data MC, content data MD, content data ME, and content data MF. The icon A1 is associated with the content data MA, the icon A2 is associated with the content data MB, and the icon A3 is associated with the content data MC. Similarly, each of the icons A4 to A6 is associated with the content data MD to the content data MF, respectively.

Since the I/F unit 341 is coupled with the HMD 100, the first display controller 311 causes the display panel 331 to display the pointer object PB. The first display controller 311 also causes the pointer object PB to be displayed at the position P1 of default, as indicated by a dashed arrow. The position P1 is the central position of the display panel 331.

In addition, since the I/F unit 341 is coupled with the HMD 100, the mode switching unit 312 executes the second mode MD2. In the second mode MD2, an input detected by the touch sensor 332 is received as an input in relative coordinates.

Here, a case is described in which a user starts a touch operation at a position PS1 and ends the touch operation at a position PS2. That is, the user touches the position PS1 with, for example, the index finger of the right hand, and moves the index finger of the right hand to the position PS2 in a state of touching the touch sensor 332 with the index finger of the right hand. Then, the user separates the index finger of the right hand from the touch sensor 332 at the position PS2.

The mode switching unit 312 detects a movement amount V1 of the touch operation. This operation allows the first display controller 311 to move the pointer object PB by a movement amount V2. That is, the pointer object PB is moved from the position P1 to a position P3 on the display panel 331. Note that the movement amount V2 has the same orientation and length as the movement amount V1.

At the position P3, the pointer object PB also points to the icon A5. In this way, a swipe operation from the position PS1 to the position PS2 causes the icon A5 to be selected. This allows the first controller 310 to execute a reproduction of the content data ME associated with the icon A5, for example.

Although in the embodiment, a case in which icons are associated with content data is described, the present disclosure is not limited to this. The icons may be associated with a program configured to execute a function, for example. In this case, a function corresponding to an icon can be executed by moving the pointer object PB in a manner to point to the icon.

Although in the embodiment, a case in which icons are displayed on the display panel 331 is described, the present disclosure is not limited to this. It suffices that an object other than the pointer object PB be displayed, in addition to the pointer object PB, on the display panel 331. For example, a button object may be displayed on the display panel 331. In this case, a function corresponding to the button object can be executed by moving the pointer object PB in a manner to point to the button object.

FIG. 7 is a chart illustrating an example of a relationship between the trajectory TR and the function FN. The function FN includes a first function FN1, a second function FN2, and a third function FN3. The first reception unit 313 receives a trajectory TR of the pointer object PB. The relationship illustrated in FIG. 7 between the trajectory TR and the function FN is stored in the non-volatile storage unit 320, for example. Further, a program configured to execute each of the first function FN1, the second function FN2, and the third function FN3 is stored in the non-volatile storage unit 320, for example.

As illustrated in FIG. 7, the trajectory TR in a circumferential shape is associated with the first function FN1. When the trajectory TR received by the first reception unit 313 has a circumferential shape, the selection unit 314 selects the first function FN1, and the execution unit 315 executes the first function FN1. The first function FN1 indicates, for example, a function of pausing the reproduction of the content data 321. The user can perform a touch operation on the touch sensor 332 to cause the trajectory TR to form a circumferential shape, to thus cause the smartphone 300 to execute the first function FN1.

Further, the trajectory TR in a triangular shape is associated with the second function FN2. When the trajectory TR received by the first reception unit 313 has a triangular shape, the selection unit 314 executes the second function FN2, and the execution unit 315 executes the second function FN2. The second function FN2 indicates, for example, a function of resuming the reproduction of the content data 321. The user can perform a touch operation on the touch sensor 332 to cause the trajectory TR to form a triangular shape, to thus cause the smartphone 300 to execute the second function FN2.

Further, the trajectory TR in a quadrangular shape is associated with the third function FN3. When the trajectory TR received by the first reception unit 313 has a quadrangular shape, the selection unit 314 executes the third function FN3, and the execution unit 315 executes the third function FN3. The third function FN3 indicates, for example, a function of ceasing the reproduction of the content data 321. The user can perform a touch operation on the touch sensor 332 to cause the trajectory TR to form a quadrangular shape, to thus cause the smartphone 300 to execute the third function FN3.

Figure 8:
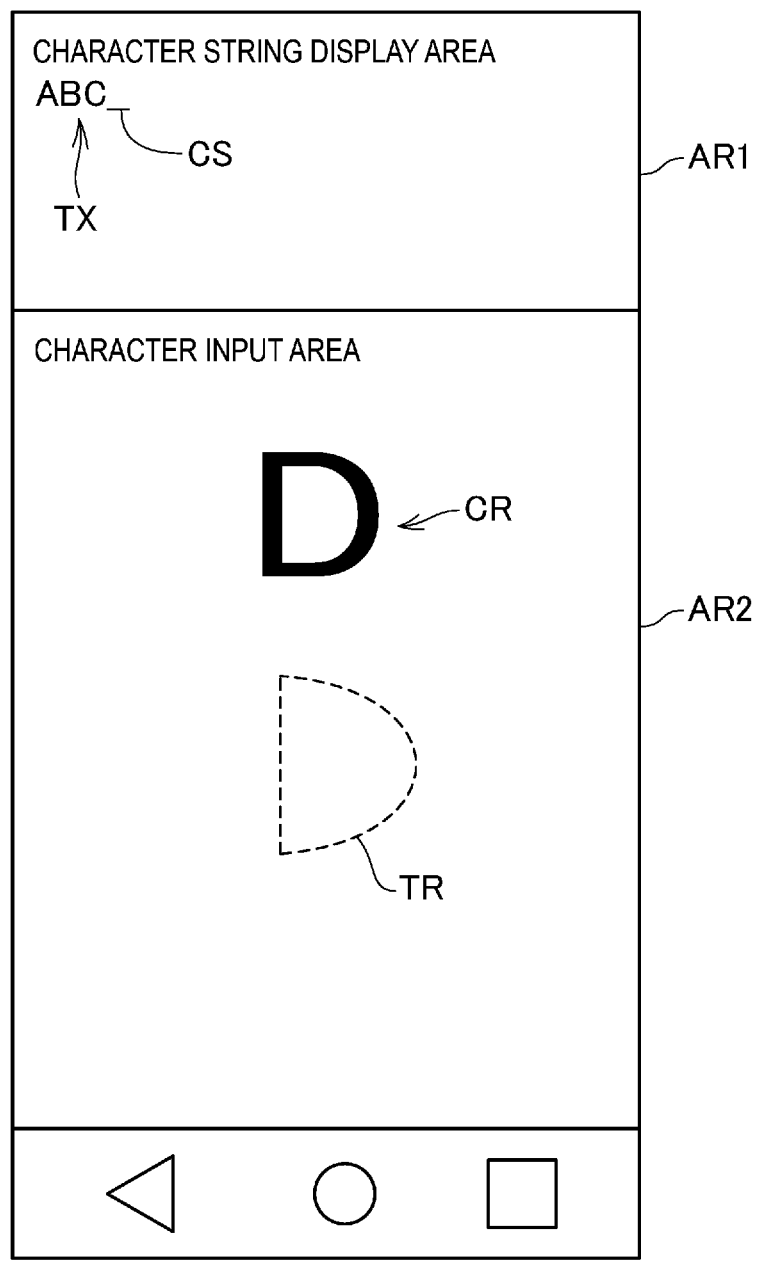
FIG. 8 is a screen view illustrating an example of an image when characters corresponding to a trajectory are input.

FIG. 8 is a screen view illustrating an example of an image when characters CR corresponding to the trajectory TR are input. The first display controller 311 causes the display panel 331 to display a character string display area AR1 and a character input area AR2.

The first display controller 311 causes the character string display area AR1 to display a character string TX of "ABC" and a cursor CS. Here, the character string TX of "ABC" is input, being in a state ready for an input of the fourth character.

The first reception unit 313 receives a trajectory TR of the pointer object PB. Here, the trajectory TR is illustrated in a dashed line. Note that, in FIG. 8, a description of the pointer object PB is not given.

The second reception unit 316 receives an input of the characters CR corresponding to the trajectory TR. Here, as the characters CR corresponding to the trajectory TR, the second reception unit 316 receives an uppercase character of "D." The first display controller 311 causes the character input area AR2 to display the characters CR received by the second reception unit 316.

Then, the first display controller 311 causes the character string display area AR1 to display the characters CR received by the second reception unit 316 at a position of the cursor CS, and the cursor CS is moved to the right by one character position. In this way, the user can perform a touch operation on the touch sensor 332 to cause the trajectory TR to form a shape of the characters CR, to thus input the characters CR into the smartphone 300.

Although in the embodiment, a case in which the characters CR are uppercase characters of alphabet is described, the present disclosure is not limited to this. The characters CR may be, for example, lowercase characters of alphabet. In addition, for example, the characters CR may be Hiragana (Japanese syllabary characters), Katakana (Japanese syllabary characters), or Chinese characters used in Japanese.

3. Description of Processing of First Controller of Smartphone

Figure 9:
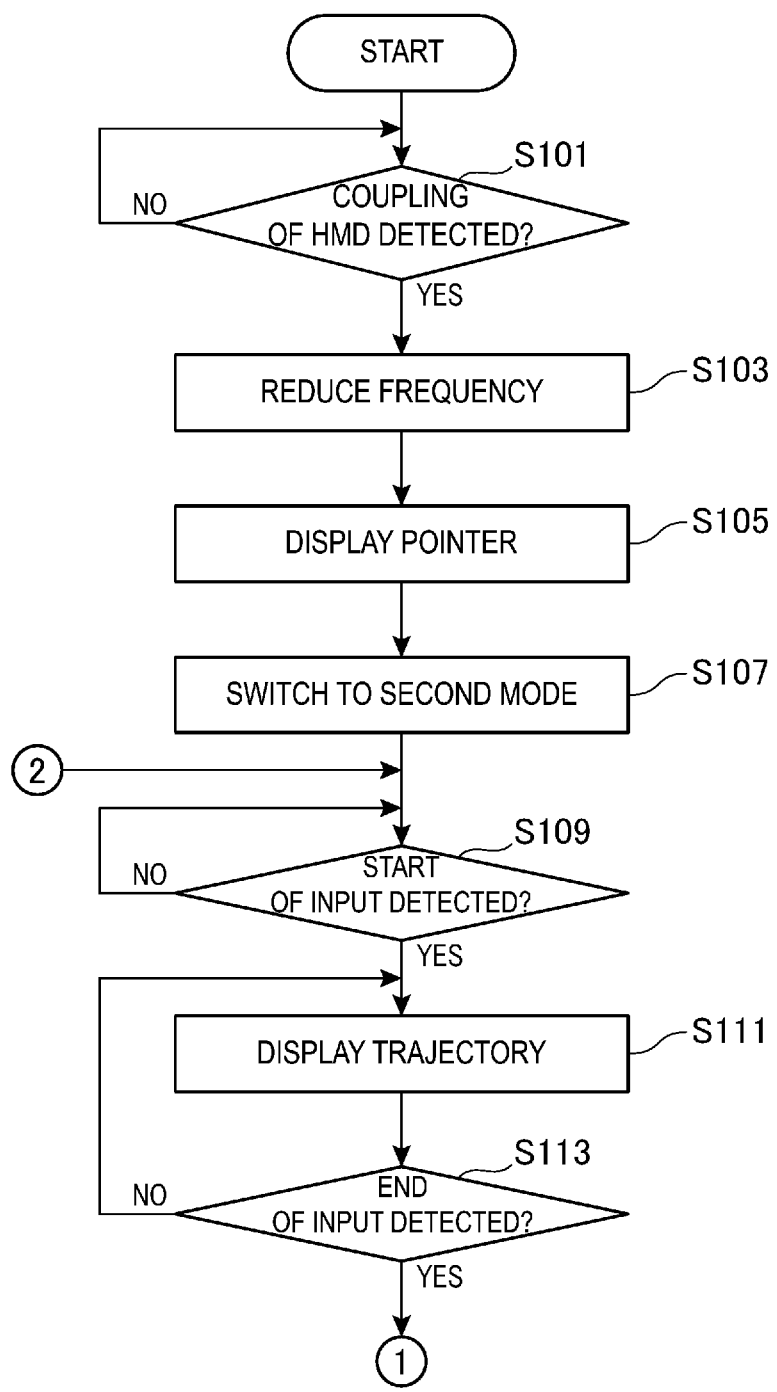
FIG. 9 is a flowchart illustrating processing of a first controller of a smartphone.
Figure 10:
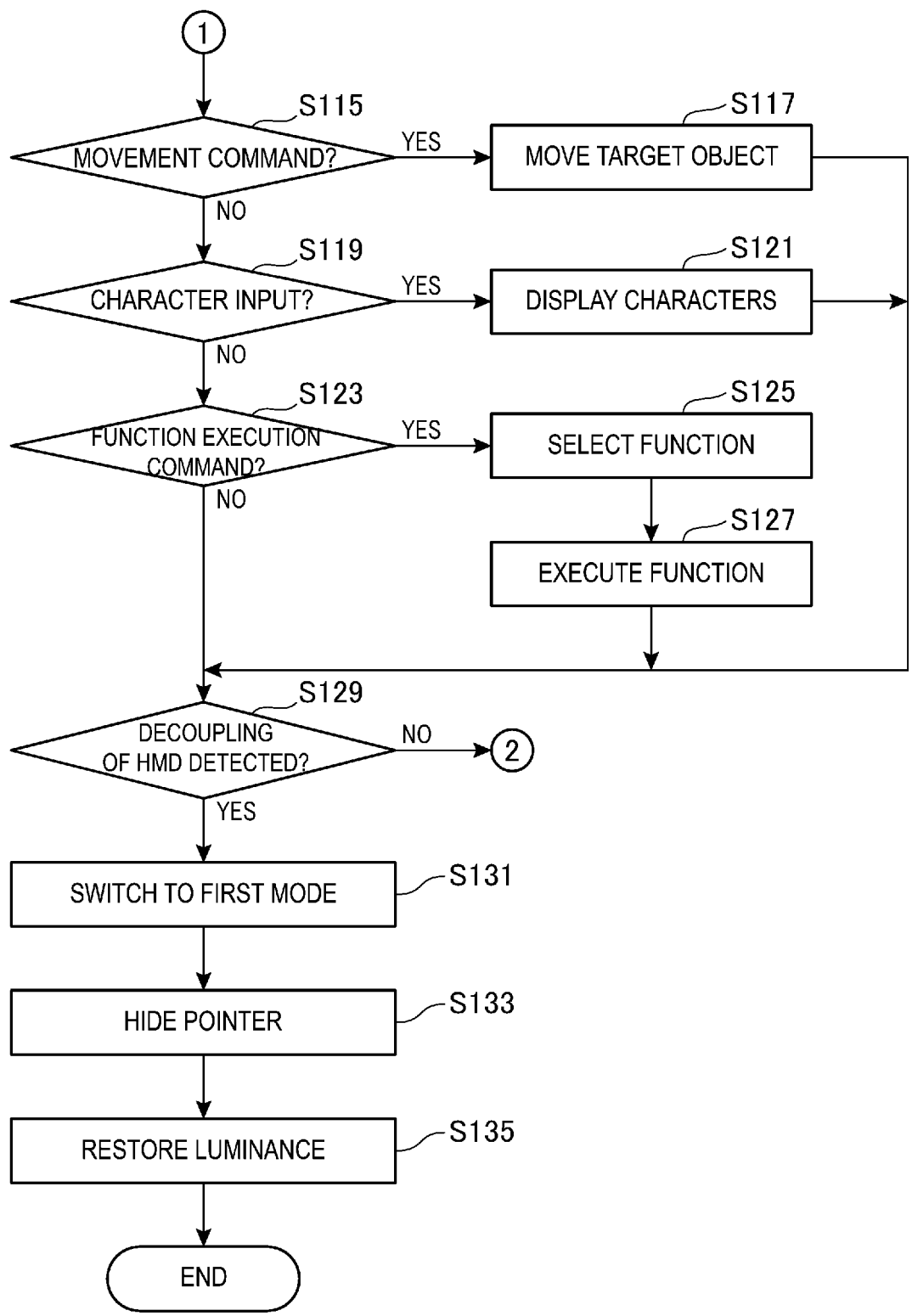
FIG. 10 is a flowchart illustrating processing of a first controller of a smartphone.

Each of FIGS. 9 and 10 is a flowchart illustrating processing of the first controller 310.

First, as illustrated in FIG. 9, in step S101, the first controller 310 determines whether the I/F unit 341 has been coupled with the HMD 100.

When the first controller 310 determines that the I/F unit 341 is not coupled with the HMD 100 (step S101: NO), the processing becomes a standby state. When the first controller 310 determines that the I/F unit 341 is coupled with the HMD 100 (step S101: YES), the processing proceeds to step S103.

Then, in step S103, the first display controller 311 reduces a luminance of the image PT displayed on the display panel 331 to less than a set luminance.

Next, in step S105, the first display controller 311 causes the pointer object PB to be displayed at the position P1 of default of the display panel 331.

Next, in step S107, the mode switching unit 312 switches the first mode MD1 to the second mode MD2, to execute the second mode MD2.

Next, in step S109, the first controller 310 determines whether a start of an input by the user into the touch sensor 332 has been detected.

When the first controller 310 determines that the start of the input by the user into the touch sensor 332 has not been detected (step S109: NO), the processing becomes a standby state. When the first controller 310 determines that the start of the input by the user into the touch sensor 332 has been detected (step S109: YES), the processing proceeds to step S111.

Then, in step S111, the first controller 310 generates second coordinate data DA2 based on an input by the user into the touch sensor 332. Then, the first reception unit 313 receives the trajectory TR of the pointer object PB based on the second coordinate data DA2, and the first display controller 311 causes the display panel 331 to display the trajectory TR.

Next, in step S113, the first controller 310 determines whether an end of the input by the user has been detected.

When the first controller 310 determines that the end of the input by the user has not been detected (step S113: NO), the processing returns to step S111. When the first controller 310 determines that the end of the input by the user has been detected (step S113: YES), the processing proceeds to step S115 in FIG. 10.

Then, as illustrated in FIG. 10, in step S115, the first controller 310 determines whether the input by the user is a movement command. The "movement command" indicates a command to move an object. Here, a case in which the object is a pointer object PB will be described.

When the first controller 310 determines that the input by the user is a movement command (step S115: YES), the processing proceeds to step S117.

Then, in step S117, the first controller 310 receives movement of a target object. For example, the first controller 310 receives a movement of the pointer object PB. Further, as described with reference to FIG. 6, when the pointer object PB that has been moved points to an icon, the first controller 310 executes a function corresponding to the icon. Then, the processing proceeds to step S129.

Although in the embodiment, a case in which the target object is the pointer object PB will be described below, the present disclosure is not limited to this. The target object may be, for example, an image object. In this case, the first controller 310 receives a movement of the image object. Then, the first display controller 311 causes the image object to be displayed at a position after the movement on the display panel 331.

When the first controller 310 determines that the input by the user is not a movement command (step S115: NO), the processing proceeds to step S119.

Then, in step S119, the first controller 310 determines whether the input by the user is an input command of the characters CR.

When the first controller 310 determines that the input by the user is an input command of the characters CR (step S119: YES), the processing proceeds to step S121.

Then, in step S121, the first reception unit 313 receives the trajectory TR of the pointer object PB. Further, the second reception unit 316 receives an input of the characters CR corresponding to the trajectory TR. Then, the first display controller 311 causes the display panel 331 to display the characters CR. Then, the processing proceeds to step S129.

When the first controller 310 determines that the input by the user is not an input command of the characters CR (step S119: NO), the processing proceeds to step S123.

Then, in step S123, the first controller 310 determines whether the input by the user is a function execution command.

When the first controller 310 determines that the input by the user is not a function execution command (step S123: NO), the processing proceeds to step S129. When the first controller 310 determines that the input by the user is a function execution command (step S123: YES), the processing proceeds to step S125.

Then, in step S125, the first reception unit 313 receives the trajectory TR of the pointer object PB, and the selection unit 314 selects a function FN corresponding to the trajectory TR.

Next, in step S127, the execution unit 315 executes a function selected by the selection unit 314, and then the processing proceeds to step S129.

Next, in step S129, the first controller 310 determines whether a coupling of the HMD 100 to the I/F unit 341 has been decoupled.

When the first controller 310 determines that the coupling of the HMD 100 to the I/F unit 341 has not been decoupled (step S129: NO), the processing returns to step S109 in FIG. 9. When the first controller 310 determines that the coupling of the HMD 100 to the I/F unit 341 has been decoupled (step S129: YES), the processing proceeds to step S131.

Then, in step S131, the mode switching unit 312 switches the second mode MD2 to the first mode MD1, to execute the first mode MD1.

Next, in step S133, the first display controller 311 causes the pointer object PB of the display panel 331 to be hidden.

Next, in step S135, the first display controller 311 restores the luminance of the image PT displayed on the display panel 331 to the set luminance. Thereafter, the processing is terminated.

Note that the step S107 in FIG. 9 and the step S131 in FIG. 10 correspond to an example of "mode-switching step."

4. Advantages of Embodiments

As described above, in the embodiment, the smartphone 300 includes the I/F unit 341 configured to be coupled with the HMD 100, the touch sensor 332, and the mode switching unit 312. The mode switching unit 312 switches, depending on whether the I/F unit 341 is coupled with the HMD 100, between the first mode MD1 and the second mode MD2, to execute the first mode MD1 and the second mode MD2. In the first mode MD1, the input detected by the touch sensor 332 is received as an input in absolute coordinates. In the second mode MD2, the input detected by the touch sensor 332 is received as an input in relative coordinates.

Thus, since the input detected by the touch sensor 332 is received as an input in relative coordinates, a user operability of the smartphone 300 can be improved even when the user is unable to view the display panel 331 of the smartphone 300.

Further, the method for controlling the display system 1, the smartphone 300, and the control program for the smartphone 300 in the embodiment can provide the same advantages as those described above.

Further, when the I/F unit 341 is not coupled with the HMD 100, the mode switching unit 312 executes the first mode MD1. While when the I/F unit 341 is coupled with the HMD 100, the mode switching unit 312 executes the second mode MD2.

Accordingly, when the I/F unit 341 is coupled with the HMD 100, the mode switching unit 312 executes the second mode MD2, and thus receives an input detected by the touch sensor 332 as an input in relative coordinates. Thus, even when the user is unable to view the display panel 331 of the smartphone 300, the user operability of the smartphone 300 can be improved.

Further, the smartphone 300 includes the display panel 331, and the first display controller 311 configured to cause the display panel 331 to display the image PT, where the image PT includes the pointer object PB.

Thus, the display panel 331 can display the pointer object PB. This allows the user operability of the smartphone 300 to be improved.

Further, when the I/F unit 341 is coupled with the HMD 100, the first display controller 311 causes the display panel 331 to display the pointer object PB. Further, when the I/F unit 341 is not coupled with the HMD 100, the first display controller 311 does not cause the display panel 331 to display the pointer object PB.

Accordingly, when the I/F unit 341 is not coupled with the HMD 100, the pointer object PB can be hidden. Thus, when the I/F unit 341 is not coupled with the HMD 100, the pointer object PB can prevent reduction of visibility of the image PT.

Further, when the I/F unit 341 is coupled with the HMD 100, the pointer object PB is displayed at the position P1 or the position P2. The position P1 indicates a default position on the display panel 331. The position P2 indicates a position at which the pointer object PB is hidden on the display panel 331.

Accordingly, when the I/F unit 341 is coupled with the HMD 100, the pointer object PB can be displayed at a suitable position. This allows the user operability of the smartphone 300 to be improved.

Further, the first reception unit 313 receives the trajectory TR of the pointer object PB. The first display controller 311 causes the display panel 331 to display the trajectory TR.

Accordingly, the first display controller 311 can cause the display panel 331 to display the trajectory TR of the pointer object PB. This allows the user operability of the smartphone 300 to be improved.

In addition, the selection unit 314 selects the function FN corresponding to the trajectory TR. The execution unit 315 executes the function selected by the selection unit 314.

Accordingly, the execution unit 315 can select the function FN corresponding to the trajectory TR to execute the selected function. This allows the user operability of the smartphone 300 to be improved.

Further, the second reception unit 316 receives an input of characters corresponding to the trajectory TR. The first display controller 311 causes the display panel 331 to display the characters received by the second reception unit 316.

Accordingly, the first display controller 311 can receive the input of the characters corresponding to the trajectory TR to cause the received characters to be displayed on the display panel 331. This allows the user operability of the smartphone 300 to be improved.

In addition, when the I/F unit 341 is coupled with the HMD 100, the first display controller 311 reduces the luminance of the display panel 331 compared to a case where the I/F unit 341 is not coupled with the HMD 100.

This suppresses reduction in electric charge amount of battery in the smartphone 300.

Further, the HMD 100 includes the projected image display unit 20, and the first display controller 311 causes the projected image display unit 20 of the HMD 100 to display the image PT displayed on the display panel 331.

This allows a so-called "mirroring display" to be easily performed.

5. Other Embodiments

The present disclosure is not limited to the configurations in the above-described embodiments, and can be implemented in various aspects without departing from the gist of the disclosure.

For example, in the above-described embodiments, the "information processing apparatus" is, but not limited to, the smartphone 300. It suffices that the "information processing apparatus" be provided with a coupling section configured to be coupled with the HMD 100, a position input unit, and a controller. For example, the "information processing apparatus" may be a Personal Digital Assistant (PDA), may be a tablet personal computer, or may be a notebook personal computer.

Although in the above-described embodiments, the configuration in which the coupling device 10 is coupled by wiring to the projected image display unit 20 is exemplified, and a configuration may also be employed in which the projected image display unit 20 is coupled wirelessly to the coupling device 10, without being limited to the above.

In addition, a part of the functions of the coupling device 10 may be provided in the projected image display unit 20. The coupling device 10 may be achieved by a plurality of devices. For example, in place of the coupling device 10, a wearable device attachable to the body or clothes of the user, or to the personal adornments worn by the user may be used. The wearable device in this case may be, for example, a watch-like device, a ring-like device, a laser pointer, a mouse, an air mouse, a game controller, a pen-like device, or the like.

Although in the above-described embodiments, the configuration in which the projected image display unit 20 and the coupling device 10 are separated, and are coupled via the coupling cable 40 is described as an example. However, a configuration may be employed in which the coupling device 10 and the projected image display unit 20 are integrally formed and are mounted on the head of the user, without being limited to the above.

Further, in the above-described embodiments, the configuration in which the user views an external scene through a display unit is not limited to a configuration in which the right light-guiding plate 26 and the left light-guiding plate 28 transmit external light. For example, the above-described configuration may be applicable to a display device configured to display an image in a state where an external scene cannot be visually recognized. Specifically, the above-described configuration may be applicable to a display device configured to display an image captured by the camera 61, images and CG generated based on the captured image, and projected images based on pre-stored projected image data or externally input projected images. This type of display device can include a so-called closed type display device with which an external scene cannot be visually recognized. For example, even if the projected image display unit 20 does not transmit external light, a configuration in which a synthetic image created by synthesizing an external scene image captured by the camera 61 and a display image is displayed by the projected image display unit 20 allows the display device to display the external scene and the image to be viewed by the user. It is needless to say that the above-described configuration may be applicable to a so-called video see-through display device thus configured.

Further, for example, in place of the projected image display unit 20, an image display unit of another type such as an image display unit worn like a cap may be employed, as long as the image display unit includes a display unit configured to display an image in correspondence to the left eye of a user, and a display unit configured to display an image in correspondence to the right eye of the user. Further, the display device may be configured, for example, as an HMD installed on a vehicle such as a vehicle and an aircraft. In addition, the display device may be configured, for example, as an HMD built into a body protector tool such as a helmet. In this case, the installation portion may be a portion to be positioned with respect to the body of the user, and a portion to be positioned with respect to the positioned portion.

In addition, a configuration in which a virtual image is formed by the half mirrors 261 and 281 at a part of the right light-guiding plate 26 and the left light-guiding plate 28, is exemplified as an optical system configured to guide image light to the eyes of the user. A configuration may also be employed, without being limited to the above, in which an image is displayed on the entire surface of the right light-guiding plate 26 and the left light-guiding plate 28, or in a display region having an area occupying the most part of the right light-guiding plate 26 and the left light-guiding plate 28. In this case, a process for reducing an image may be included in an operation for changing a display position of the image.

Moreover, the optical elements are not limited to the right light-guiding plate 26 and the left light-guiding plate 28 including the half mirrors 261 and 281, and any optical components that allow image light to enter the eyes of the user can be used, where specifically, diffraction grating, prisms, and holographic display units may be used.

At least some of the functional blocks illustrated in FIG. 4, FIG. 5, and the like may be achieved with hardware, or a configuration may be employed in which the at least some of the functional blocks are achieved together with hardware and software, without being limited to the configuration in which independent hardware resources are arranged as illustrated in the figures.

A control program executed by the first controller 310 may also be stored in the non-volatile storage unit 320 or another storage unit within the first controller 310. A configuration may also be employed in which a control program stored in an external apparatus is acquired via the communication unit 345 and the like to be executed. Further, among configurations formed in the first controller 310, at least one of the first reception unit 313 and the second reception unit 316 may be formed as a user interface (UI).

A configuration formed in the coupling device 10 may also be redundantly formed in the projected image display unit 20. For example, a processor similar to the processor of the coupling device 10 may be disposed in the projected image display unit 20, or the processor included in the coupling device 10 and the processor of the projected image display unit 20 may be configured to execute separate functions.

Further, processing units in the flowchart illustrated in FIGS. 9 and 10 are divided in accordance with the primary processing details to make the processing in the first controller 310 of the smartphone 300 easily recognizable. Embodiments are not limited by the manner and name of division of the processing units illustrated in the flowcharts depicted in FIGS. 9 and 10. In addition, the processing of the first controller 310 can be divided into further more processing units in accordance with processing details, and can be divided such that one processing unit includes further more processing. Further, the order of the processing in the above-described flowchart is not limited to the illustrated example as well.

Further, the method for controlling the smartphone 300 can be achieved by causing the computer included in the smartphone 300 to execute a control program corresponding to the method for controlling the smartphone 300. In addition, the control program can be stored in a storage medium in which the control program is stored in a manner readable by a computer. For the storage medium, a magnetic storage medium, an optical storage medium, or a semiconductor memory device can be used. Specifically, a portable or stationary type storage medium, such as a flexible disk, a Compact Disk Read Only Memory (CD-ROM), a DVD, a Blu-ray (registered trademark) disc, a magneto-optical disc, a flash memory, or a card type storage medium can be exemplified. The storage medium may also be a non-volatile storage device such as a RAM, a ROM, or an HDD, which are internal storage devices included in an image display device. Further, a method for controlling the smartphone 300 can also be achieved such that a control program corresponding to the method for controlling the smartphone 300 is stored in a server apparatus or the like, and then the control program is downloaded from the server apparatus to the smartphone 300.

What is claimed is:

1. An information processing apparatus comprising;
   a coupling section configured to be coupled with a display device;
   a position input unit configured to:
      detect a touch operation; and
      output absolute coordinates of a position of the touch operation, and relative coordinates of an amount of movement of the touch operation; and
   a mode switching unit configured to:
      execute a first mode in which an input detected by the position input unit is received as an input in the absolute coordinates of the position of the touch operation, and
      execute a second mode in which an input detected by the position input unit is received as an input in the relative coordinates of the amount of movement of the touch operation,
   the mode switching unit being configured to switch, depending on whether the coupling section is coupled with the display device, between the first mode and the second mode, to execute the first mode or the second mode.

2. The information processing apparatus according to claim 1, wherein
   the mode switching unit is configured to execute the first mode when the coupling section is not coupled with the display device, and is configured to execute the second mode when the coupling section is coupled with the display device.

3. The information processing apparatus according to claim 1, comprising
   a first display unit, and
   a display controller configured to cause the first display unit to display an image, the image including a pointer object.

4. The information processing apparatus according to claim 3, wherein
   the display controller is configured, when the coupling section is coupled with the display device, to cause the first display unit to display the pointer object, and
   is configured, when the coupling section is not coupled with the display device, not to cause the first display unit to display the pointer object.

5. The information processing apparatus according to claim 4, wherein
   the display controller is configured, when the coupling section is coupled with the display device, to display the pointer object at a default position in the first display unit, or a position at which the pointer object is hidden in the first display unit.

6. The information processing apparatus according to claim 3, comprising
   a first reception unit configured to receive a trajectory of the pointer object, wherein
   the display controller is configured to cause the first display unit to display the trajectory.

7. The information processing apparatus according to claim 6, comprising
   a selection unit configured to select a function corresponding to the trajectory, and
   an execution unit configured to execute a function selected by the selection unit.

8. The information processing apparatus according to claim 6, comprising
   a second reception unit configured to receive an input of a character corresponding to the trajectory, wherein
   the display controller is configured to cause the first display unit to display the character.

9. The information processing apparatus according to claim 3, wherein
   the display controller is configured, when the coupling section is coupled with the display device, to reduce a luminance of the first display unit, compared to a case where the coupling section is not coupled with the display device.

10. The information processing apparatus according to claim 3, wherein
    the display device includes a second display unit, and
    the display controller is configured to cause the second display unit of the display device to display the image displayed by the first display unit.

11. A non-transitory computer-readable storage medium storing a control program for an information processing apparatus, the information processing apparatus comprising:
    a coupling section configured to be coupled with a display device;
    a position input unit configured to:
       detect a touch operation; and output absolute coordinates of a position of the touch operation, and relative coordinates of an amount of movement of the touch operation; and a computer, the control program being configured to cause the computer to function as a mode switching unit, the mode switching unit being configured to:

execute a first mode in which an input detected by the position input unit is received as an input in the absolute coordinates of the position of the touch operation, and execute a second mode in which an input detected by the position input unit is received as an input in the relative coordinates of the amount of movement of the touch operation, and the mode switching unit being configured to switch, depending on whether the coupling section is coupled with the display device, between the first mode and the second mode, to execute the first mode or the second mode.

12. A method for controlling an information processing apparatus, the information processing apparatus including: a coupling section configured to be coupled with a display device; and a position input unit, the method comprising:

detecting, by the position input unit, a touch operation;

outputting, by the position input unit, absolute coordinates of a position of the touch operation, and relative coordinates of an amount of movement of the touch operation;

executing a first mode in which an input detected by the position input unit is received as an input in the absolute coordinates of the position of the touch operation;

executing a second mode in which an input detected by the position input unit is received as an input in the relative coordinates of the amount of movement of the touch operation; and switching, depending on whether the coupling section is coupled with the display device, between the first mode and the second mode, to execute the first mode or the second mode.

* * * * *